(12) United States Patent
Jung et al.

(10) Patent No.: US 12,476,260 B2
(45) Date of Patent: Nov. 18, 2025

(54) PEROVSKITE COMPOUND, A CATALYST COMPRISING THE SAME, AND AN ELECTROCHEMICAL DEVICE COMPRISING THE SAME

(71) Applicant: KOREA ADVANCED INSTITUTE OF SCIENCE AND TECHNOLOGY, Daejeon (KR)

(72) Inventors: WooChul Jung, Daejeon (KR); Jun Hyuk Kim, Daejeon (KR); Se Jong Ahn, Daejeon (KR)

(73) Assignee: KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 536 days.

(21) Appl. No.: 17/965,892

(22) Filed: Oct. 14, 2022

(65) Prior Publication Data

US 2023/0121988 A1   Apr. 20, 2023

(30) Foreign Application Priority Data

Oct. 19, 2021   (KR) ........................ 10-2021-0139613

(51) Int. Cl.
*B01J 23/02*   (2006.01)
*B01J 23/10*   (2006.01)
(Continued)

(52) U.S. Cl.
CPC .......... *H01M 4/9033* (2013.01); *C01G 51/66* (2013.01); *C01P 2002/50* (2013.01);
(Continued)

(58) Field of Classification Search
CPC . B01J 23/002; B01J 23/02; B01J 23/10; B01J 23/20; B01J 23/22; B01J 23/28;
(Continued)

(56) References Cited

U.S. PATENT DOCUMENTS

| | | | | |
|---|---|---|---|---|
| 7,153,559 B2* | 12/2006 | Ito | ........................ | H01M 8/0282 502/4 |
| 11,667,539 B2* | 6/2023 | Jung | ........................ | B01J 23/34 423/598 |
| 2009/0286680 A1* | 11/2009 | Hirano | .................... | B01J 23/002 502/326 |

FOREIGN PATENT DOCUMENTS

CN       104409742       3/2015
KR   10-2016-0083490       7/2016

OTHER PUBLICATIONS

P. Prasopchokkul et a. "Ba0.5Sr0.5(Co0.8Fe0.2)1-xTaxO3-s perovskite anode in solid oxide electrolysis cell for hydrogen production from high-temperature steam electrolysis". International Journal of Hydrogen Energy 46 (2021) 7023-7036.*

(Continued)

*Primary Examiner* — Cam N. Nguyen
(74) *Attorney, Agent, or Firm* — LEX IP MEISTER, PLLC

(57) ABSTRACT

A perovskite compound having a cubic perovskite structure, high catalytic activity in oxygen reduction and evolution reactions, and excellent durability is provided. The perovskite compound is represented by the following Chemical Formula 1:

$$(A_a A'_{1-a})_\alpha (B_b B'_{1-b})_\beta O_{3-\delta}$$   (Chemical Formula 1)

in Chemical Formula 1
A is Ba,
A' is one or more selected from the group consisting of lanthanoid elements, Ag, Ca, and Sr,
B is Co.
B' is one or more selected from the group consisting of Ta, Nb, V, Sc, Y, Mo, W, Zr, Hf, and Ce,
a is a real number greater than 0.9 and 1 or less,
b is a real number greater than 0.5 and less than 0.9.

(Continued)

α and β real numbers of 0.9 to 1.1. The perovskite compound can be used as a catalyst of electrochemical devices, particularly as a fuel cell catalyst.

8 Claims, 5 Drawing Sheets

(51) Int. Cl.
| | | |
|---|---|---|
| B01J 23/20 | (2006.01) | |
| B01J 23/22 | (2006.01) | |
| B01J 23/28 | (2006.01) | |
| B01J 23/30 | (2006.01) | |
| B01J 23/50 | (2006.01) | |
| B01J 23/66 | (2006.01) | |
| B01J 23/75 | (2006.01) | |
| B01J 23/78 | (2006.01) | |
| B01J 23/83 | (2006.01) | |
| B01J 23/847 | (2006.01) | |
| B01J 23/85 | (2006.01) | |
| B01J 23/882 | (2006.01) | |
| B01J 23/887 | (2006.01) | |
| B01J 23/888 | (2006.01) | |
| C01G 51/66 | (2025.01) | |
| H01M 4/90 | (2006.01) | |

(52) U.S. Cl.
CPC ...... *C01P 2002/72* (2013.01); *C01P 2002/76* (2013.01); *C01P 2006/40* (2013.01)

(58) Field of Classification Search
CPC ... B01J 23/30; B01J 23/50; B01J 23/66; B01J 23/682; B01J 23/683; B01J 23/686; B01J 23/687; B01J 23/75; B01J 23/78; B01J 23/83; B01J 23/847; B01J 23/8472; B01J 23/8474; B01J 23/8476; B01J 23/85; B01J 23/882; B01J 23/887; B01J 23/8872; B01J 23/8877; B01J 23/888; B01J 23/8885
See application file for complete search history.

(56) References Cited

OTHER PUBLICATIONS

Isao Kagomiya et al. "Crystal structure and oxygen permeation properties of (La,Ba,Sr)(Co,Ta)O3-s". Solid States Ionics 285 (2016) 180-186.*

Qing Liao et al. "Novel bifunctional tantalum and bismuth co-doped perovskite BaBi0.05Co0.8Ta0.15O3-s with high oxygen permeation". Journal of Membrane Science 468 (2014) 184-191.*

Huixia Luo et al. "Oxygen Permeability and Structural Stability of a Novel Tantalum-Doped Perovskie BaCo0.7Fe0.2Ta0.1O3-s". AIchE Journal vol. 56, No. 3, Mar. 2010, p. 604-610.*

Xiaoyan Yang et al. "Ba8CoNb6—xTaxO24 Eight-Layer Shifted Hexagonal Perovskite Ceramics with Spontaneous Ta5+ Ordering and Near-Zero". Inorganic Chemistry, 2019, vol. 58, p. 10974-10982.*

Qing Liao et al., "Novel bifunctional tantalum and bismuth co-doped perovskite BaBi0.05Co0.8Ta0.15O3-δ with high oxygen permeation," Journal of Membrane Science, vol. 468, pp. 184-191, Oct. 2014, doi: https://doi.org/10.1016/j.memsci.2014.06.005.

Wei Zhou et al., "Novel SrSc0.2Co0.8O3d as a cathode material for low temperature solid-oxide fuel cell", Elsevier, Electrochemistry Communications, 10, Aug. 23, 2008, pp. 1647-1651.

* cited by examiner

[FIG. 1(a)]
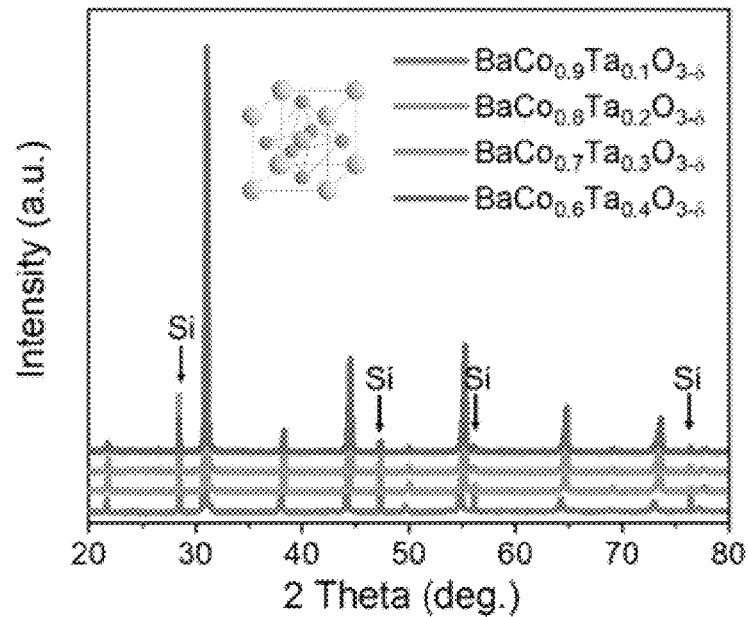
[FIG. 1(b)]
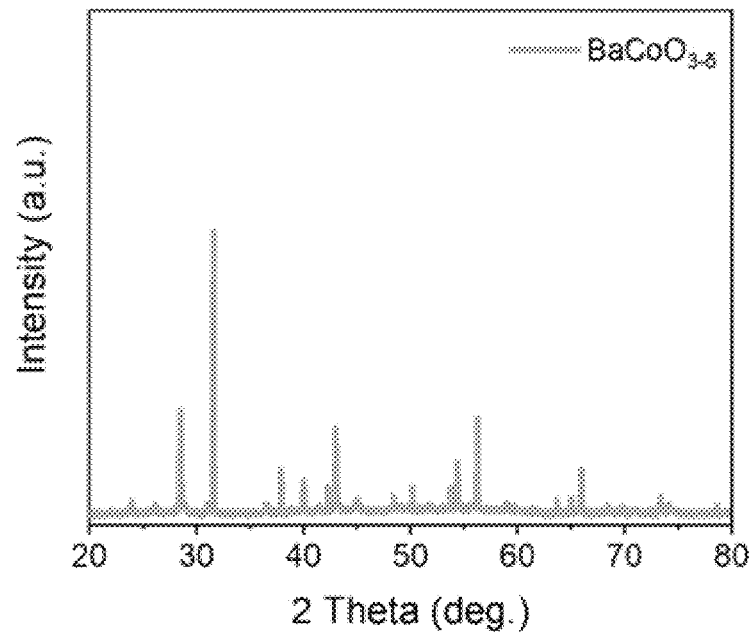

[FIG. 2]
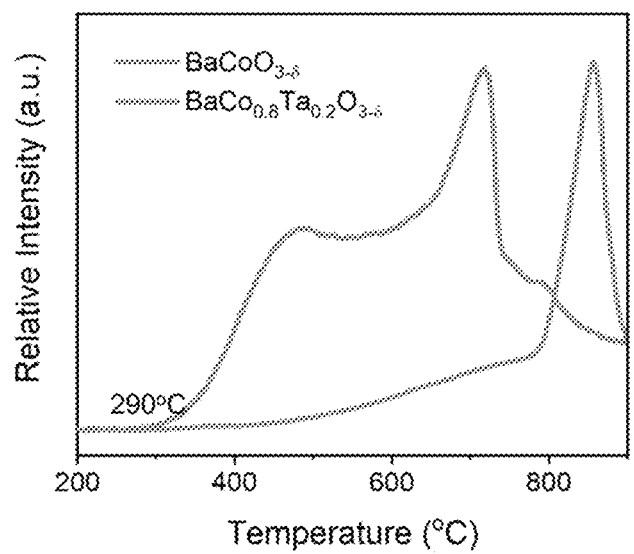

[FIG. 3]
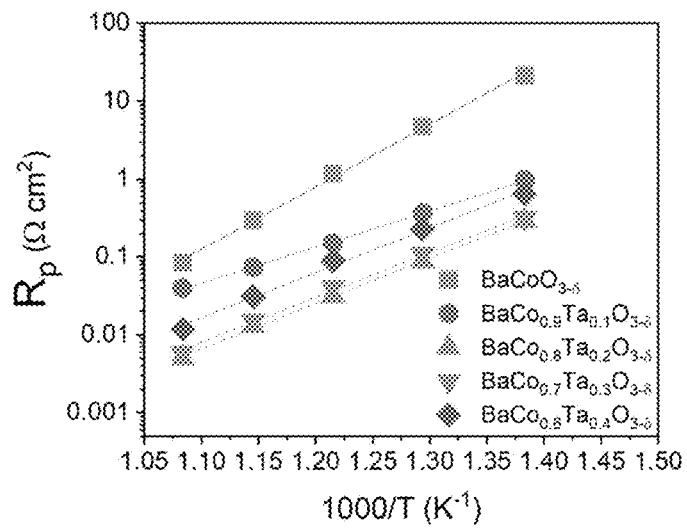
[FIG. 4]
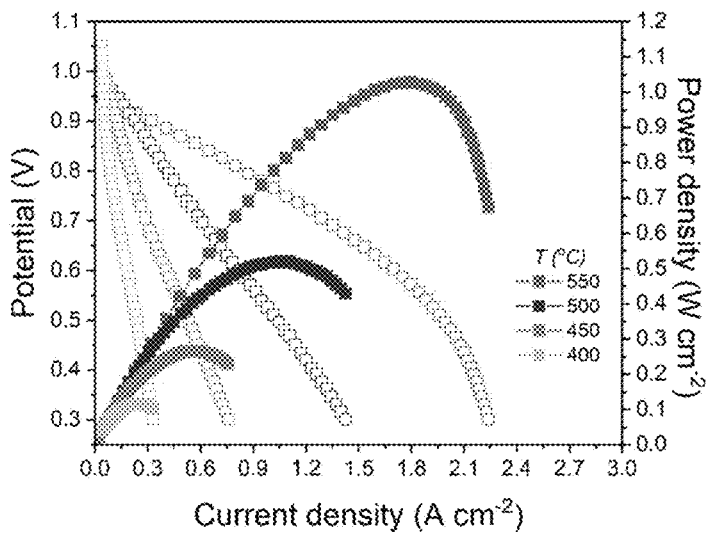

[FIG. 5(a)]
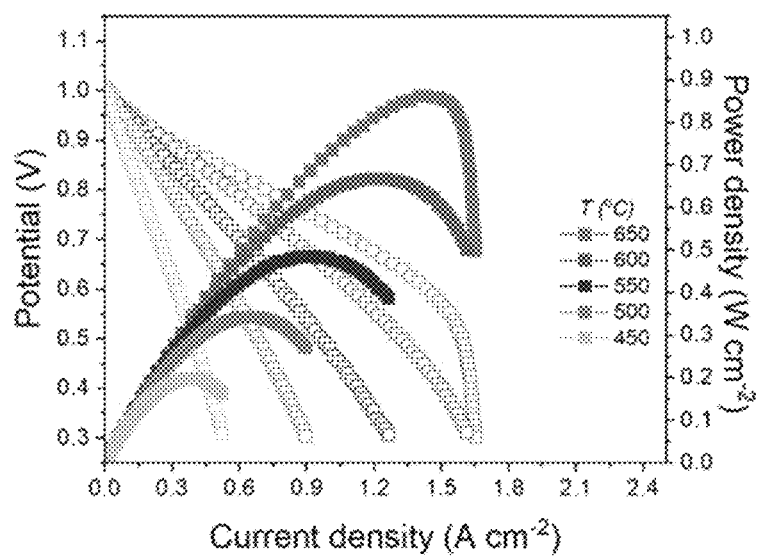
[FIG. 5(b)]
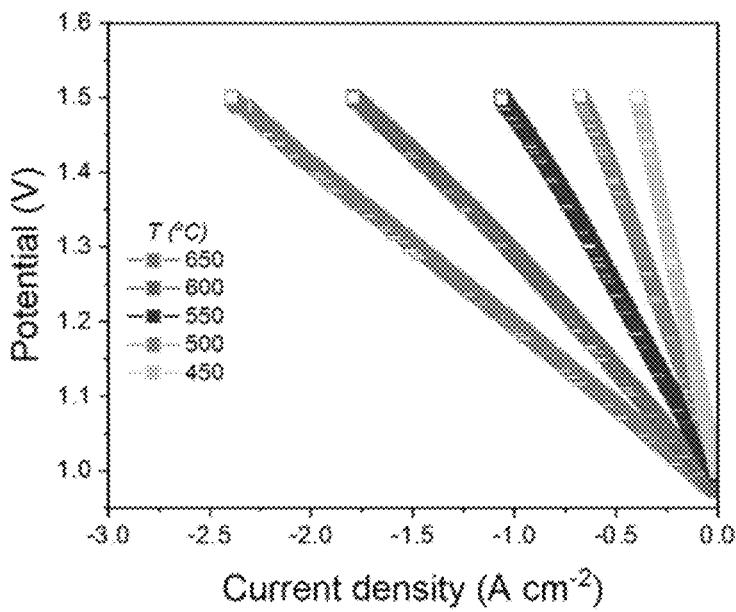

[FIG. 6]
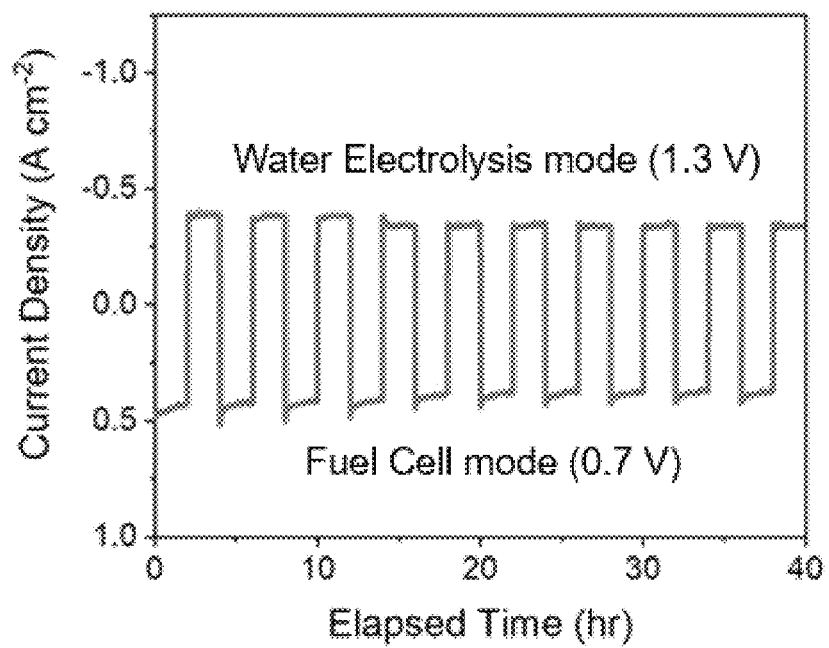

PEROVSKITE COMPOUND, A CATALYST COMPRISING THE SAME, AND AN ELECTROCHEMICAL DEVICE COMPRISING THE SAME

TECHNICAL FIELD

The present invention relates to a novel cubic perovskite compound that can be used as a catalyst of an electrochemical device.

BACKGROUND ART

A solid oxide fuel cell (SOFC) is an energy conversion device directly converting chemical energy into electric energy, and consists of oxygen ion conductive electrolyte, and an air-electrode and a fuel-electrode positioned on both sides thereof.

As an air-electrode of a solid oxide fuel cell (SOFC), $SrCoO_{3-\delta}$-based perovskite ($ABO_3$) compounds containing Sr at A-site have been mainly used.

However, this material had serious problems in terms of durability in that segregation of Sr on the surface was generated during the operation of a fuel cell, and thus, performances of a solid oxide fuel cell were degraded.

In order to solve the problem, a method of replacing Sr with Ba was reported. Ba has more abundant reserves than Sr (crustal content: Ba 425 ppm>Sr 370 ppm), and the cost is about 3.8% of Sr, thus much inexpensive. Moreover, since Ba has a larger ion size (149 pm) than Sr (132 pm), when forming perovskite, it facilitates movement of oxygen ions, and consequently, lowers activation energy of oxygen reduction and evolution reactions, and thus, is favorable for the operation of a fuel cell at low temperature. Further, Ba has higher basicity than Sr, which is favorable for forming protons in crystal lattice ($OH_o^-$ protonic defects), and thus, it can be used for reversible protonic ceramic electrochemical cells (PCEC) recently receiving attention, as well as solid oxide fuel cells.

However, Ba and Co are easily volatilized due to low melting points, and easily form a hexagonal phase rather than a cubic perovskite structure having low catalytic activity in oxygen reduction and evolution reactions, and thus, it is difficult to use $BaCoO_{3-\delta}$-based material as an air-electrode of an electrochemical device.

Therefore, there exists demands for development of a perovskite compound overcoming the problem of $BaCoO_{3-\delta}$-based material.

DETAILED DESCRIPTION OF THE INVENTION

Technical Problem

It is an object of the invention to provide a novel cubic perovskite compound.

Technical Solution

In order to achieve the object, according to the invention, there is provided a perovskite compound represented by the following Chemical Formula 1:

$$(A_aA'_{1-a})_\alpha(B_bB'_{1-b})\beta O_{3-\delta}$$ [Chemical Formula 1]

in the Chemical Formula 1,
A is Ba,

A' is one or more selected from the group consisting of lanthanoid elements, Ag, Ca, and Sr,
B is Co,
B' is one or more selected from the group consisting of Ta, Nb, V, Sc, Y, Mo, W, Zr, Hf, and Ce,
a is a real number greater than 0.9 and 1 or less,
b is a real number greater than 0.5 and less than 0.9,
α and β real numbers of 0.9 to 1.1.

The present invention is characterized by using additional element particularly indicated by B' in the Chemical Formula 1, so as to prevent a $BaCoO_{3-\delta}$-based perovskite compound having a hexagonal phase structure rather than a cubic perovskite structure.

If the additional element indicated by B' (for example, Ta) is additionally used and doped in a $BaCoO_{3-\delta}$-based perovskite compound, the compound may have a structure of the Chemical Formula 1, and although not theoretically limited, as the additional element indicated by B' is doped, a cubic perovskite structure has more stabilized structure instead of a hexagonal phase structure, and thus, when used as a catalyst of a fuel cell, may exhibit high catalytic activity in oxygen reduction and evolution reactions.

Preferably, A' is one or more selected from the group consisting of La, Ce, Pr, Nd, Pm, Sm, Eu, Gd, Tb, Dy, Ho, Er, Tm, Yb, Lu, Ag, Ca, and Sr.

Preferably, a is 1. In case a is 1, the Chemical Formula 1 is represented by the following Chemical Formula 1-1:

$$(A_aA'_{1-a})_\alpha(B_bB'_{1-b})\beta O_{3-\delta}$$ [Chemical Formula 1]

Preferably, B' is Ta.
Preferably, b is a real number of 0.6 to 0.8, more preferably 0.6, 0.7, or 0.8, most preferably 0.8.
Preferably, each of α and β is 1.
Preferably, the Chemical Formula 1 is represented by the following Chemical Formula 2:

$$BaCo_{0.8}Ta_{0.2}O_{3-\delta}$$ [Chemical Formula 2]

Preferably, the perovskite compound represented by the Chemical
Formula 1 has a cubic structure. As explained above, as the additional element indicated by B' is doped, the compound may have a cubic perovskite structure that may have high catalytic activity in oxygen reduction and evolution reactions, rather than a hexagonal phase structure.

According to the invention, there is also provided a method for preparing the perovskite compound of the invention, comprising a step of calcining $ACO_3$, $A'CO_3$, $Co_3O_4$, and $B'_2O_5$ at the stoichiometric ratio of the Chemical Formula 1.

The preparation method is a solid-state method, and it is preferable that starting material is previously dried, and it is preferable to heat treat at 1000 to 1500° C., 1100 to 1400° C., or 1100 to 1300° C. for calcination. Further, it is preferable that the heat treatment is conducted for 5 hours to 24 hours, or 6 hours to 12 hours.

According to the invention, there is also provided a fuel cell catalyst comprising the perovskite compound of the invention.

The electrochemical cell may be a solid oxide fuel cell, a protonic ceramic fuel cell, or a protonic ceramic electrolysis cell, and the perovskite compound according to the invention may be applied to an air-electrode of the electrochemical cell.

Advantageous Effects

The perovskite compound according to the invention has a cubic perovskite structure, has high catalytic activity in oxygen reduction and evolution reactions, and has excellent durability, and thus, can be used as a catalyst of an electrochemical device, particularly as a fuel cell catalyst.

BRIEF DESCRIPTION OF THE DRAWING

FIG. 1(a) and FIG. 1(b) show the X-ray diffraction analysis result of the materials synthesized in Examples 1 to 3 and Comparative Examples 1 and 2. FIG. 1(a) refers to the materials synthesized in Examples 1 to 3 and Comparative Example 2, and FIG. 1(b) refers to the material synthesized in Comparative Example 1.

FIG. 2 shows the oxygen temperature programmed desorption ($O_2$-TPD) analysis result of the materials of Example 1 and Comparative Example 1.

FIG. 3 shows the analysis result of the half cell of Experimental Example 2 through Electrochemical Impedance Spectroscopy.

FIG. 4 shows the measurement result of the performance of the solid oxide fuel cell of Experimental Example 3.

FIG. 5(a) and FIG. 5(b) show the measurement result of the performances of the protonic ceramic fuel cell (FIG. 5(a)) and water electrolysis cell (FIG. 5(b)) of Experimental Example 4.

FIG. 6 is a graph showing current according to operation time while reversibly operating the protonic ceramic electrochemical device of Experimental Example 4.

DETAILED DESCRIPTION OF THE EMBODIMENTS

Hereinafter, the invention will be explained in detail through Examples and Experimental Examples. These Examples and Experimental Examples are presented only to explain the invention more specifically, and the scope of the invention is not limited thereby.

Example 1

$BaCo_{0.8}Ta_{0.2}O_{3-\delta}$ perovskite was synthesized by a solid-state method. Specifically, the metal precursors of $BaCO_3$, $Co_3O_4$, $Ta_2O_5$ were ball milled at a stoichiometric ratio together with ethanol for 24 hours using zirconia ball, dried at 90° C. for 24 hours, and then, calcined at 1150° C. for 10 hours to synthesize $BaCo_{0.8}Ta_{0.2}O_{3-\delta}$ perovskite. The powders prepared were repeatedly subjected to the process of ball milling-drying-calcination to form cubic perovskite of higher purity.

Example 2

$BaCo_{0.7}Ta_{0.3}O_{3-\delta}$ perovskite was synthesized by a solid-state method. Specifically, the metal precursors of $BaCO_3$, $Co_3O_4$, $Ta_2O_5$ were ball milled at a stoichiometric ratio together with ethanol for 24 hours using zirconia ball, dried at 90° C. for 24 hours, and then, calcined at 1150° C. for 10 hours to synthesize $BaCo_{0.7}Ta_{0.3}O_{3-\delta}$ perovskite. The powders prepared were repeatedly subjected to the process of ball milling-drying-calcination to form cubic perovskite of higher purity.

Example 3

$BaCo_{0.6}Ta_{0.4}O_{3-\delta}$ perovskite was synthesized by a solid-state method. Specifically, the metal precursors of $BaCO_3$, $Co_3O_4$, $Ta_2O_5$ were ball milled at a stoichiometric ratio together with ethanol for 24 hours using zirconia ball, dried at 90° C. for 24 hours, and then, calcined at 1150° C. for 10 hours to synthesize $BaCo_{0.6}Ta_{0.4}O_{3-\delta}$ perovskite. The powders prepared were repeatedly subjected to the process of ball milling-drying-calcination to form cubic perovskite of higher purity.

Comparative Example 1

$BaCoO_{3-\delta}$ was synthesized by a solid-state method. Specifically, the metal precursors of $BaCO_3$, $Co_3O_4$ were ball milled together with ethanol for 24 hours using zirconia ball, dried at 90° C. for 24 hours, and then, calcined at 1150° C. for 10 hours to synthesize $BaCoO_{3-\delta}$.

Comparative Example 2

$BaCo_{0.9}Ta_{0.1}O_{3-\delta}$ perovskite was synthesized by a solid-state method. Specifically, the metal precursors of $BaCO_3$, $Co_3O_4$, $Ta_2O_5$ were ball milled at a stoichiometric ratio together with ethanol for 24 hours using zirconia ball, dried at 90° C. for 24 hours, and then, calcined at 1150° C. for 10 hours to synthesize $BaCo_{0.9}Ta_{0.1}O_{3-\delta}$ perovskite. The powders prepared were repeatedly subjected to the process of ball milling-drying-calcination to form cubic perovskite of higher purity.

Experimental Example 1

The X-Ray diffraction analysis results of the materials synthesized in Examples 1 to 3 and Comparative Examples 1 and 2 were shown in FIG. 1(a) and FIG. 1(b). FIG. 1(a) refers to the materials synthesized in Examples 1 to 3 and Comparative Example 2, and FIG. 1(b) refers to the material synthesized in Comparative Example 1

As shown in FIG. 1(a) and FIG. 1(b), the material of Comparative Example 1 wherein a Ta precursor was not doped, exhibits a hexagonal phase, while the materials of Example 1 to 3 and Comparative Example 2 wherein Ta was doped, exhibit cubic perovskite structures.

Further, oxygen temperature programmed desorption ($O_2$-TPD) of the materials of Example 1 and Comparative Example 1 were analyzed, and the results were shown in FIG. 2.

As shown in FIG. 2, it was confirmed that in the cubic perovskite of Example 1, oxygen desorption occurs from 290° C., and thus, it has high oxygen mobility and the resulting good oxygen catalyst properties. To the contrary, it was confirmed that in the hexagonal phase material of Comparative Example 1, oxygen desorption does not occur until 800° C., and thus, it has low oxygen mobility.

Experimental Example 2

For evaluation of oxygen reduction property, a half cell was manufactured as follows.

Specifically, 0.35 g of $Sm_{0.2}Ce_{0.8}O_{2-\delta}$ powder (SDC; fuelcellmaterials company) were molded in the form of pellet, and sintered at 1400° C. for 5 hours. 8 g of an Ink vehicle (fuelcellmaterials company) and 8 g of the $BaCo_{0.5}Ta_{0.2}O_{3-\delta}$ powder prepared in Example 1 were put in a Nalgene bottle and mixed, and then, zirconia ball was introduced therein to conduct ball-milling for 24 hours, thus preparing a paste, and the paste was applied on both sides of the SDC pellet by screen printing, and heat treated at 900° C. for 2 hours to prepare a half cell.

For comparison, each half cell was prepared by the same method as above, except that each 8 g of the powders prepared in Example 2 and 3, and Comparative Example 1 and 2 were used instead of 8 g of $BaCo_{0.8}Ta_{0.2}O_{3-\delta}$ powder, when preparing a paste.

The performances of each half cell prepared were analyzed through Electrochemical Impedance Spectroscopy, and the results were shown in FIG. 3.

As shown in FIG. 3, it was confirmed that the electrode made of the cubic perovskite of Example 1 has much smaller electrode resistance ($R_p$), and lower activation energy, compared to the electrode made of the hexagonal material of Comparative Example 1. For example, at 450° C., the $BaCo_{0.8}Ta_{0.2}O_{3-\delta}$ electrode has resistance of 0.29 $\Omega cm^2$, while the $BaCoO_{3-\delta}$ electrode has resistance of 21 $\Omega cm^2$, and thus there was about 100 times difference in electrode performance.

Particularly, the amount of Ta doping also had a significant influence on the oxygen reduction reaction, and the case wherein Ta was 20% doped at B-site as in Example 1 exhibited the best performance. It was judged that in case Ta is doped in an amount greater than 20%, due to the property of Ta having an oxidation number of 5+, oxygen vacancy inside perovskite decreases, and thus, catalyst properties are lowered to some degree.

Experimental Example 3

A button-type unit device of a solid oxide fuel cell (SOFC) having oxygen ion conductor as electrolyte was manufactured as follows.

60 wt % NiO powder and 40 wt % $Gd_{0.1}Ce_{0.9}O_{2-\delta}$ powder (fuelcellmaterials company) as oxygen conductor were put in a bottle and mixed, and then, zirconia ball was introduced to conduct ball-milling for 24 hours, thus preparing mixed powders. The mixed powders were molded with a 1.3 cm×1.3 cm tetragonal mold, and then, heat treated at 950° C. for 1 hour to form a fuel-electrode support. 1 g of $Gd_{0.2}Ce_{0.8}O_{2-\delta}$ powder, 2 g of triethanolamine, and 10 g of ethanol were mixed to prepare an electrolyte solution, and the electrolyte solution was coated on the fuel-electrode support by drop coating, and then, heat treated at 1450° C. for 5 hours to prepare a dense electrolyte. The $BaCo_{0.8}Ta_{0.2}O_{3-\delta}$ paste prepared in Experimental Example 2 was applied on the above prepared electrolyte by screen printing, and heat treated at 900° C. for 2 hours to prepare a unit device.

The operation of the electrochemical device was progressed as follows.

The manufactured unit device was placed in a reactor, and sealed with a sealant such that that gas between the fuel-electrode and air-electrode are not mixed. For the gas phase conditions applied to the SOFC unit device, air was introduced in the air-electrode, and 3% humidified hydrogen was supplied to the fuel-electrode. The performance of the fuel cell was measured at 400° C. to 550° C., and the results were shown in FIG. 4.

As shown in FIG. 4, the maximum power density was about 1.03 W $cm^{-2}$ at 550° C., thus exhibiting higher performance compared to the existing SOFC. It is judged that $BaCoO_{3-\delta}$ was successfully stabilized to cubic perovskite by Ta, and thereby, movement of oxygen molecules became smooth, and thus, electrochemical properties were improved.

Experimental Example 4

A button-type unit device of reversible protonic ceramic electrochemical cell (PCEC) having proton conductor as an electrolyte was manufactured as follows.

Specifically, 65 wt % NiO powder and 35 wt % $BaZr_{0.1}Ce_{0.7}Y_{0.1}Yb_{0.1}O_{3-\delta}$ powder (kceracell Co. Ltd.) as oxygen conductor were put in a Nalgene bottle and mixed, and then, zirconia ball was introduced to conduct ball-milling for 24 hours, thus preparing mixed powders. The mixed powders were molded with a 1.3 cm×1.3 cm tetragonal mold, and then, heat treated at 950° C. for 1 hour to form a fuel-electrode support. 1 g of $BaZr_{0.1}Ce_{0.7}Y_{0.1}Yb_{0.1}O_{3-\delta}$ powder, 2 g of triethanolamine, and 10 g of ethanol were mixed to prepare an electrolyte solution, and the electrolyte solution was coated on the fuel-electrode support by drop coating, and then, heat treated at 1450° C. for 5 hours to prepare a dense electrolyte. The $BaCo_{0.8}Ta_{0.2}O_{3-\delta}$ paste prepared in Experimental Example 2 was applied on the above prepared electrolyte by screen printing, and heat treated at 900° C. for 2 hours to prepare a unit device.

The operation of the electrochemical device was progressed as follows.

The manufactured unit device was placed in a reactor, and sealed with a sealant such that that gas between the fuel-electrode and air-electrode are not mixed. For the gas phase conditions applied to the PCFC unit device, 3% humidified air was introduced in the air-electrode, and 3% humidified hydrogen was supplied to the fuel-electrode. The performance of the fuel cell was measured at 450° C. to 650° C., and the results were shown in FIG. 5(a) and FIG. 5(b).

As shown in FIG. 5(a), at fuel cell mode, the maximum powder density was about 0.86 W $cm^{-2}$ at 650° C., thus exhibiting higher performance compared to the existing PCFC. Further, as shown in FIG. 5(b), at water electrolysis mode, current density was 1.48 A $cm^{-2}$ at 1.3V, thus exhibiting higher performance compared to the existing water electrolysis cell.

Compared to the previously used $SrCoO_{3-\delta}$ electrode, the cubic perovskite of Example 1 has the A-site substituted by Ba, and has higher basicity, and thus, it is easy to form proton in grids, thus enabling triple ion transfer ($H^+$, $O^{2-}$, $e^-$).

The proton conductive electrochemical device may be reversibly operated at fuel cell mode or water electrolysis mode through the following Reaction Formula.

Fuel Cell Mode (Oxygen Reduction Reaction)
 fuel-electrode: $H_2 \rightarrow 2H^+ + 2e^-$
 air-electrode: $2H^+ + \frac{1}{2}O_2 + 2e^- \rightarrow H_2O$ Water Electrolysis Mode (Oxygen Evolution Reaction)
 fuel-electrode: $2H^+ + 2e^- \rightarrow H_2$
 air-electrode: $H_2O \rightarrow 2H^+ + \frac{1}{2}O_2 + 2e^-$ Further, FIG. 6 is a graph showing current according to operation time while reversibly operating the proton conductive electrochemical device.

Specifically, the electrochemical device was operated at fuel cell mode at 0.7 V for 2 hours, and operated at water electrolysis mode at 1.3 V for 2 hours. This was set as one cycle, and total 10 cycles were operated for 40 hours. During the operation, air-electrode was continuously humidified, and in general, the humidified environment promoted segregation of the existing Sr-based electrode and more rapidly deteriorated the performance, and had a negative fluence on long-term stability of an electrochemical device. However, it was confirmed that the perovskite material of Example 1 has high stability such hat there is little degradation for 40 hours, and exhibits very stable behavior.

The invention claimed is:

1. A perovskite compound represented by the following Chemical Formula 1:

$$(A_aA'_{1-a})_\alpha B_b B'_{1-b})_\beta O_{3-\delta}$$  (Chemical Formula 1)

in Chemical Formula 1,

A is Ba,

A' is one or more selected from the group consisting of lanthanoid elements, Ag, Ca, and Sr, B is Co, B' is one or more selected from the group consisting of Ta, Nb, V, Sc, Y, Mo, W, Zr, Hf, and Ce, a is a real number of greater than 0.9 and less than or equal to 1.0 b is a real number of greater than 0.5 and less than 0.9,

α and β are real numbers of 0.9 to 1.1.

2. The compound according to claim 1, wherein a is 1.

3. The compound according to claim 1, wherein B' is Ta.

4. The compound according to claim 1, wherein b is a real number of 0.6 to 0.8.

5. The compound according to claim 1, wherein each of α and β is 1.

6. The compound according to claim 1, wherein the Chemical Formula 1 is represented by the following Chemical Formula 2:

$$BaCo_{0.8}Ta_{0.2}O_{3-\delta} \qquad \text{(Chemical Formula 2)}.$$

7. The compound according to claim 1, wherein the perovskite compound represented by the Chemical Formula 1 has a cubic structure.

8. A fuel cell catalyst comprising the compound according to claim 1.

* * * * *